United States Patent
Lee et al.

(10) Patent No.: US 9,310,645 B2
(45) Date of Patent: Apr. 12, 2016

(54) LIGHT SOURCE ASSEMBLY, DISPLAY APPARATUS HAVING THE SAME AND METHOD OF MANUFACTURING THE SAME

(71) Applicant: Samsung Display Co., LTD., Yongin, Gyeonggi-Do (KR)

(72) Inventors: Lu-Ly Lee, Yongin-si (KR); Dong-Hyeon Lee, Seoul (KR); Young-Min Park, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 78 days.

(21) Appl. No.: 14/217,818

(22) Filed: Mar. 18, 2014

(65) Prior Publication Data

US 2015/0109559 A1    Apr. 23, 2015

(30) Foreign Application Priority Data

Oct. 22, 2013    (KR) .......................... 10-2013-0126123

(51) Int. Cl.
 *G02F 1/1335*    (2006.01)
(52) U.S. Cl.
 CPC .... *G02F 1/133606* (2013.01); *G02F 1/133603* (2013.01); *G02F 1/133605* (2013.01); *G02F 2001/133607* (2013.01)

(58) Field of Classification Search
 CPC ........................ G02F 1/133606; F21Y 2101/02
 See application file for complete search history.

(56) References Cited

U.S. PATENT DOCUMENTS

| 7,152,988 B2 | 12/2006 | Hung |
| 2006/0071231 A1 | 4/2006 | Han et al. |
| 2013/0188100 A1* | 7/2013 | Ikuta .............................. 348/739 |

FOREIGN PATENT DOCUMENTS

| JP | 2002-318305 A | 10/2002 |
| JP | 2011-034076 A | 2/2011 |
| KR | 1020080099281 A | 11/2008 |
| KR | 1020120026586 A | 3/2012 |

* cited by examiner

*Primary Examiner* — Thanh-Nhan P Nguyen
(74) *Attorney, Agent, or Firm* — Cantor Colburn LLP

(57) ABSTRACT

A light source assembly includes a substrate extending in a first direction, and a plurality of light source parts arranged in the first direction. The light source part includes a light source disposed on the substrate to generate light, a first reflecting element disposed on the substrate and having a first opening which exposes the light source, a second reflecting element disposed on a first reflecting element and having a second opening which exposes the light source, the second reflecting element being smaller than the first reflecting element in a plan view, and a lens disposed on the light source and the second reflecting element to diffuse the light from the light source.

20 Claims, 13 Drawing Sheets

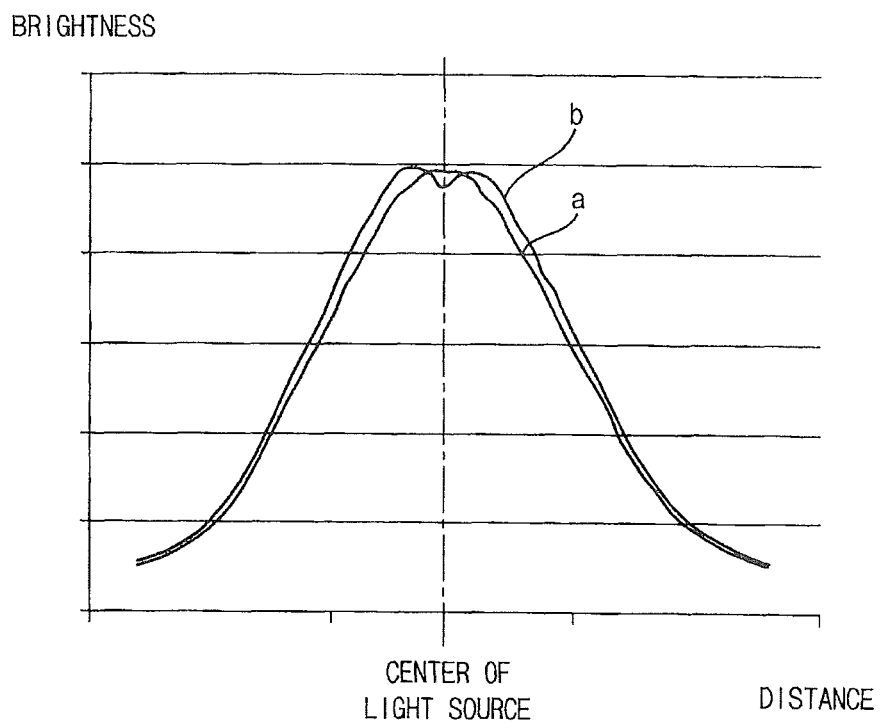

LIGHT SOURCE ASSEMBLY, DISPLAY APPARATUS HAVING THE SAME AND METHOD OF MANUFACTURING THE SAME

This application claims priority to Korean Patent Application No. 10-2013-0126123, filed on Oct. 22, 2013, and all the benefits accruing therefrom under 35 U.S.C. §119, the disclosure of which is incorporated by reference herein in its entirety.

BACKGROUND

1. Field

Exemplary embodiments of the invention relate to a light source assembly, a display apparatus having the light source assembly and a method of manufacturing the display apparatus.

More particularly, exemplary embodiments of the invention relate to a direct-type light source assembly for a liquid crystal display apparatus, a display apparatus having the light source assembly and a method of manufacturing the display apparatus.

2. Description of the Related Art

A display apparatus having light weight and small size has been manufactured. A cathode ray tube ("CRT") display apparatus has been used due to a good performance and a competitive price thereof. However the CRT display apparatus has a weakness with a size or portability thereof. Therefore the liquid display apparatus has been highly regarded due to small size, light weight and low-power-consumption of the liquid display apparatus.

The liquid crystal display apparatus applies a voltage to a specific molecular arrangement to change the molecular arrangement. The liquid crystal display apparatus displays an image using changes of optical property (for example, birefringence, rotatory polarization, dichroism and light scattering) of a liquid crystal cell of the liquid crystal display according to the changes of the molecular arrangement.

SUMMARY

A liquid crystal display apparatus includes a liquid crystal display panel, and a light source assembly to provide light to the liquid crystal display panel. The light source assembly may be classified into direct-type and edge-type according to position of a light source relative to the liquid crystal display panel. An exiting light distribution from the light source assembly is important for uniform brightness of the liquid crystal display apparatus. Especially, in the direct-type light source assembly, the exiting light distribution immediately around the light source may be not uniform, and therefore, there remains a need for a direct-type light source assembly having improved exiting light distribution.

One or more exemplary embodiment of the invention provides a light source assembly capable of obtaining a uniform exiting light distribution.

One or more exemplary embodiment of the invention also provides a display apparatus having the light source assembly.

One or more exemplary embodiment of the invention also provides a method of manufacturing the display apparatus.

According to an exemplary embodiment of the invention, a light source assembly includes a substrate extending in a first direction, and a plurality of light source parts arranged in the first direction. Each light source part includes a light source which is on the substrate and generates light, a first reflecting element on the substrate, a first opening which is defined in the first reflecting element and exposes the light source, a second reflecting element on the first reflecting element, a second opening which is defined in the second reflecting element and exposes the light source, where the second reflecting element is smaller than the first reflecting element in a plan view, and a lens which is on the light source and the second reflecting element and diffuses the light from the light source.

In an exemplary embodiment, the first reflecting element may include a material which causes mirror reflection of light, and the second reflecting element may include a material which causes diffuse reflection of light. Otherwise, the first reflecting element may include the material which causes diffuse reflection of light, and the second reflecting element may include the material which causes mirror reflection of light.

In an exemplary embodiment, the material which causes mirror reflection may include silver or aluminum. The material which causes diffuse reflection may include polyethylene phthalate ("PET") and have a white color.

In an exemplary embodiment, each of the first and second reflecting elements may have a circular sheet shape. The lens may have a hemisphere shape. An external diameter of the first reflecting element may be more than about 100% and less than about 130% of an external diameter of the lens. An external diameter of the second reflecting element may be more than about 70% and less than 100% of the external diameter of the lens.

In an exemplary embodiment, the light source assembly may further include a marker which is on the substrate and indicates a proper position of the lens relative to the light source on the substrate.

In an exemplary embodiment, the lens may include a top surface having a dome shape, a bottom surface opposite to the top surface, and a fixing part protruded from the bottom surface. The fixing part may be attached on the substrate and contact the marker.

In an exemplary embodiment, the lens may further include a fixing protrusion protruded from the fixing portion. The marker may be a fixing hole defined through the substrate. The fixing protrusion may be received in the fixing hole.

In an exemplary embodiment, the marker of the substrate may be three points correspond to vertexes of a triangle which has a center as the light source. The fixing portion of the lens may be disposed corresponding to the three points.

In an exemplary embodiment, the first opening of the first reflecting element may be larger than the second opening of the second reflecting element.

According to another exemplary embodiment of the invention, a light source assembly includes a substrate extending in a first direction, and a plurality of light source parts arranged in the first direction. Each light source part includes a light source which is on the substrate and generates light, a first reflecting element on the substrate, a first opening which is defined in the first reflecting member and exposes the light source, where the first reflecting element includes a first area, a second area adjacent to the first area, and a plurality of beads which is in the second area and diffuses the light in the second area, and a lens which is on the light source and the first reflecting element and diffuses the light.

In an exemplary embodiment, the first reflecting element may include a material which causes mirror reflection of light, and the second reflecting element may include a material which causes diffuse reflection of light. Otherwise, the first reflecting element may include the material which causes diffuse reflection of light, and the second reflecting element may include the material which causes mirror reflection of light.

According to an exemplary embodiment of the invention, a display apparatus includes a liquid crystal display panel which displays an image, a light source assembly which supplies light to the liquid crystal display panel and is under the liquid crystal display panel, a reflecting sheet between the liquid crystal display panel and the light source assembly, a plurality of lens openings defined in the reflecting sheet, and a receiving container which receives the liquid crystal display panel, the light source assembly and the reflecting sheet and including a bottom portion, and side walls extending from the bottom portion substantially perpendicular to the bottom portion. The light source assembly includes a substrate which extends in a first direction and is on the bottom portion of the receiving container, and a plurality of light source parts arranged in the first direction. Each light source part includes a light source which is on the substrate and generates light, a first reflecting element on the substrate, a first opening which is defined in the first reflecting element and exposes the light source, a second reflecting element on the first reflecting element, a second opening which is defined in the second reflecting element and exposes the light source, where the second reflecting element is smaller than the first reflecting element in a plan view, and a lens which is on the light source and the second reflecting element and diffuses the light from the light source. The lens openings of the reflecting sheet correspond to the light source parts of the light source assembly.

In an exemplary embodiment, the first reflecting element may include a material which causes mirror reflection of light, and the second reflecting element may include a material which causes diffuse reflection of light. Otherwise, the first reflecting element may include the material which causes diffuse reflection of light, and the second reflecting element may include the material which causes mirror reflection of light.

In an exemplary embodiment, a portion of the lens of the light source part of the light source assembly may be disposed above a corresponding lens opening of the reflecting sheet.

In an exemplary embodiment, the corresponding lens opening of the reflecting sheet may be larger than the lens of the light source part of the light source assembly. The lens opening may be smaller than the first reflecting element of the light source part of the light source assembly.

In an exemplary embodiment, the display apparatus may further include a plurality of the light source assemblies on the bottom portion of the receiving container. The light source assemblies may be arranged in a second direction which is perpendicular to the first direction.

According to an exemplary embodiment of the invention, a method of manufacturing a display apparatus includes forming a light source assembly, placing the light source assembly on a bottom portion of a receiving container and receiving a display panel in the receiving container. The forming the light source assembly includes forming a light source part formed by mounting a light emitting diode ("LED") chip on a substrate which extends in a first direction, by a surface mounting technology ("SMT"), forming a first reflecting element in which a first opening is defined and exposes the LED chip on the substrate including the LED chip mounted thereon, forming a second reflecting element in which a second opening is defined and exposes the LED chip, the second reflecting element being smaller than the first reflecting element, and forming a lens on the substrate including the LED chip and the first and second reflecting elements thereon. The first reflecting element may include a material which causes mirror reflection of light, and the second reflecting element may include a material which causes diffuse reflection of light. Otherwise, the first reflecting element may include the material which causes diffuse reflection of light, and the second reflecting element may include the material which causes mirror reflection of light.

In an exemplary embodiment, the method may further include attaching a reflecting sheet on the light source assembly, after the placing the light source assembly. The forming the light source assembly may further including forming a plurality of light source parts. A plurality of lens openings may be defined in the reflecting sheet and corresponding to the plurality of the light source parts.

In an exemplary embodiment, the forming the light source assembly may further include forming a marker adjacent to a position for the LED chip, on the substrate, before the mounting the LED chip. The marker may indicate the position for the LED chip on the substrate.

In an exemplary embodiment, the lens may include a top surface having a dome shape, a bottom surface opposite to the top surface, and a fixing portion protruded from the bottom surface. The forming the lens may include attaching the fixing portion to the marker on the substrate, to fix the lens on the substrate relative to the position for the LED chip.

According to one or more exemplary embodiment of the invention, a light source assembly includes first and second reflecting elements disposed under and/or adjacent to a light source, and having different sizes and different reflecting properties, so that distribution of exiting light from the light source assembly may be uniform.

In addition, one or more exemplary embodiment of a display apparatus includes a reflecting sheet in which a lens opening is defined larger than a lens of the light source part and smaller than the first reflecting element of the light source part, so that reflecting efficiency may be improved.

In addition, one or more exemplary embodiment of a light source assembly, a marker is disposed on a substrate of the light source assembly, and the lens of the light source part has a fixing portion corresponding to the marker, so that the lens may be disposed at a proper position on the substrate with respect to the light source.

BRIEF DESCRIPTION OF THE DRAWINGS

The above and other features of the invention will become more apparent by describing in detail exemplary embodiments thereof with reference to the accompanying drawings, in which:

FIG. 13 is a graph showing brightness of reflected light according to materials of a reflecting element.

DETAILED DESCRIPTION

Figure 1:
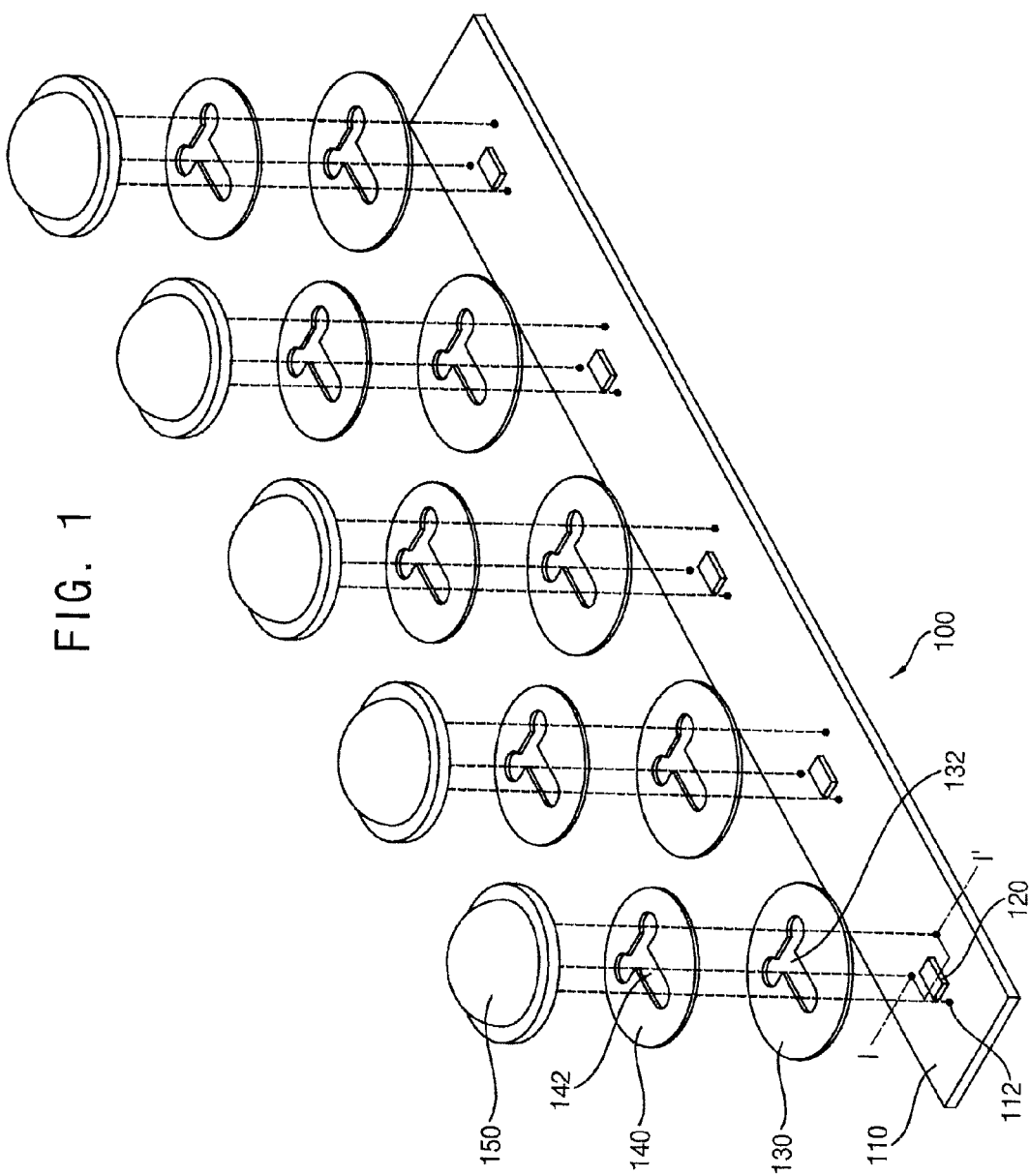
FIG. 1 is an exploded perspective view illustrating an exemplary embodiment of a light source assembly according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
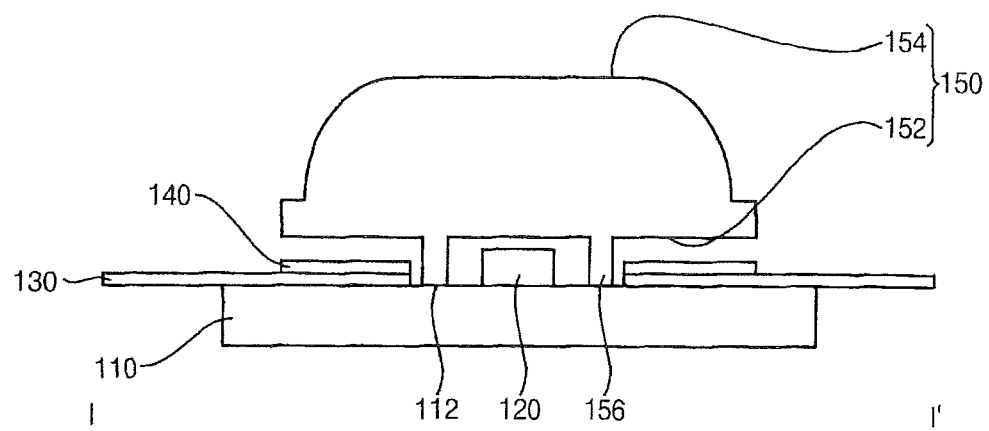
FIG. 2 is a cross-sectional view taken along line I-I' of FIG. 1.
Figure 3:
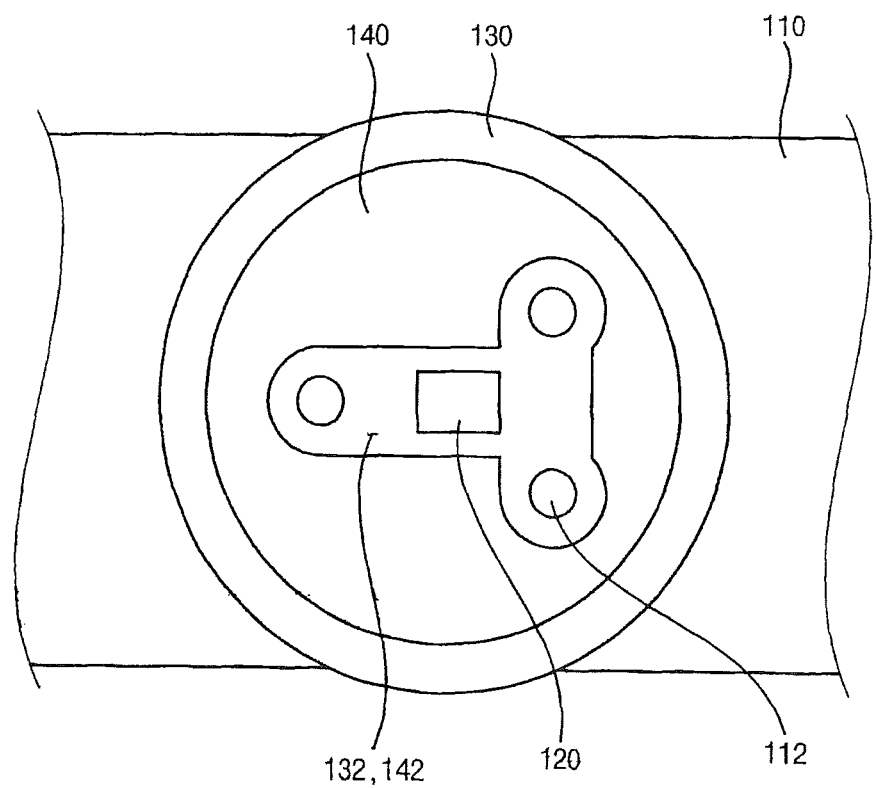
FIG. 3 is an enlarged view of an exemplary embodiment of a light source unit of the light source assembly of FIG. 1.

FIG. 1 is an exploded perspective view illustrating an exemplary embodiment of a light source assembly according to the invention. FIG. 2 is a cross-sectional view taken along line I-I' of FIG. 1. FIG. 3 is an enlarged view of an exemplary embodiment of a light source unit of the light source assembly of FIG. 1.

Referring to FIGS. 1 to 3, a light source assembly 100 includes a substrate 110, and a plurality of light source parts disposed on the substrate 110. A light source part among the plurality of light source parts includes a light source 120, a first reflecting element 130, a second reflecting element 140 and a lens 150.

The substrate 110 may be an insulation substrate, a flexible printed circuit board, etc. The substrate 110 may have a bar shape which extends in a direction. A metal pattern (not shown) may be on the substrate 110 and configured to drive the light source 120. In one exemplary embodiment, for example, the substrate 110 may includes a polyimide resin and, a copper wiring may be disposed on the substrate 110 to drive the light source 120.

A marker 112 is disposed on the substrate 110 and adjacent to the light source 120. The marker 112 indicates a specific position on the substrate 110. The marker 112 may indicate a position at which the lens 150 is fixed. The marker 112 may have various shapes according to the lens 150. In one exemplary embodiment, for example, the marker 112 may collectively include three discrete points adjacent to the light source 120. The three points may correspond to vertexes of a triangle which has a center as the light source 120.

The light source 120 is disposed on the substrate 110. The light source 120 is electrically connected to the metal pattern disposed on the substrate 110. The light source 120 generates light. The light source 120 may be a light emitting diode ("LED") chip. In an exemplary embodiment of manufacturing the light source assembly 100, the LED chip may be mounted on the substrate 110 by a surface mounting technology ("SMT").

The light source 120 may be a light source unit including a plurality of LED chips configured to generate white light. Thus, the light source 120 may include a light source unit having a plurality of LED chips. In one exemplary embodiment, for example, the light source 120 may be a light source unit including a red LED chip which emits red light, a green LED chip which emits green light and a blue LED chip which emits blue light. In addition, the light source 120 may collectively include a LED chip emitting a specific color and a phosphor changing the specific color to white light. In one exemplary embodiment, for example, the light source 120 may be a light source unit having a blue LED chip and a yellow phosphor. Alternatively, the yellow phosphor may be included in the lens 150 instead of the light source unit.

The first reflecting element 130 is disposed on the substrate 110. A first opening 132 is defined in the first reflecting element 130 and exposes the light source 120 disposed on the substrate 110. The first opening 132 exposes the light source 120 and the marker 112. The first opening 132 may have a shape to minimize size thereof. In one exemplary embodiment, for example, when the marker 112 includes three discrete points adjacent to the light source 120, the first opening 132 may have a continuous shape to expose the light source 120 and the three points (refer to FIG. 3). A planar area of the first reflecting element 130 is maximized as the size of the first opening 132 is minimized, so that reflecting efficiency may be improved.

The first reflecting element 130 may have a circular shape in a plan view (e.g., a top plan view), with the light source 120 as a center, and a sheet shape (e.g., relatively thin and uniform) in a cross-sectional view. The first reflecting element 130 may have a cross-sectional thickness less than about 0.2 millimeter (mm).

The first reflecting element 130 may include a material which cause mirror reflection. In one exemplary embodiment, for example, the first reflecting element 130 may be a reflecting sheet including silver or aluminum. The first reflecting element 130 reflects light from the light source 120 toward the lens 150.

The second reflecting element 140 is disposed on the first reflecting element 130. Thus, the second reflecting element 140 overlaps the first reflecting element 130. A second opening 142 is defined in the second reflecting element 140 and exposes the light source 120 disposed on the substrate 110. The second opening 142 exposes the light source 120 and the marker 112. The second opening 142 may have a shape to minimize a size thereof. In one exemplary embodiment, for example, when the marker 112 includes three discrete points adjacent to the light source 120, the second opening 142 may have a continuous shape to expose the light source 120 and the three points (refer to FIG. 3.) A planar area of the second reflecting element 140 is maximized as the size of the second opening 142 is minimized, so that reflecting efficiency may be improved. The second opening 142 may be substantially a same size and/or shape as and coincide (e.g., be aligned) with the first opening 132 of the first reflecting element 130. The light source 120 and the marker 112 are simultaneously exposed by the first opening 132 of the first reflecting element 130 and the second opening 142 of the second reflecting element 140.

The second reflecting element 140 may have a circular sheet shape in the plan view with the light source 120 as a center. The second reflecting element 140 may have a cross-sectional thickness less than about 0.2 mm.

The second reflecting element 140 may include a material which causes a diffuse reflection. In one exemplary embodiment, for example, the second reflecting element 140 may be a reflecting sheet including polyethylene phthalate ("PET"). In addition, the second reflecting element 140 may have a white color. The second reflecting element 140 reflects light from the light source 120 toward the lens 150.

The lens 150 is disposed on the substrate 110 including the light source 120, and the first and second reflecting elements 130 and 140 thereon. The lens 150 makes a distribution of the light from the light source 120 substantially uniform.

The lens 150 includes a top surface 154, and a bottom surface 152 opposite to and facing the top surface 154.

The top surface 154 may have a dome shape to make the distribution of the light form the light source 140 uniform. The bottom surface 152 faces the substrate 110. A fixing portion 156 protrudes from the bottom surface 152 and is configured to allow separation of the bottom surface 152 from the light source 120 and to fix the lens 150 on the substrate 110. The fixing portion 156 is protruded from the lens 150 toward the substrate 110.

The fixing portion 156 is disposed corresponding to the marker 112 of the substrate 110. The fixing portion 156 corresponds to the marker 112, so that the fixing portion 156 may be attached and fixed on the marker 112 of the substrate 110. In one exemplary embodiment for example, an adhesive layer (not shown) between the fixing portion 156 and the substrate 110 may be further disposed to attach the fixing portion 156 on the substrate 110. The adhesive layer may include thermoset such as phenolic resin, urea resin, melanin resin, unsaturated polyester resin, epoxy resin, polyurethane resin, etc.

The fixing portion 156 of the lens 150 is aligned on the marker 112 of the substrate 110, and the lens 150 may be disposed on a proper position with respect to the light source 120, so that the distribution of light from the light source 120 may be precisely controlled.

The lens 150 may have a hemispherical shape or a hemiellipsoidal shape with the light source 120 as a center. A boundary of the lens 150 may be coincident with a boundary of the second reflecting element 140 in the plan view.

The light source part includes the light source 120, the first reflecting element 130, the second reflecting element 140 and the lens 150. A plurality of the light source parts may be arranged in a length direction of the substrate 110. Thus, the light source assembly 100 may be used as a LED bar of a backlight assembly for a liquid crystal display apparatus.

Figure 4:
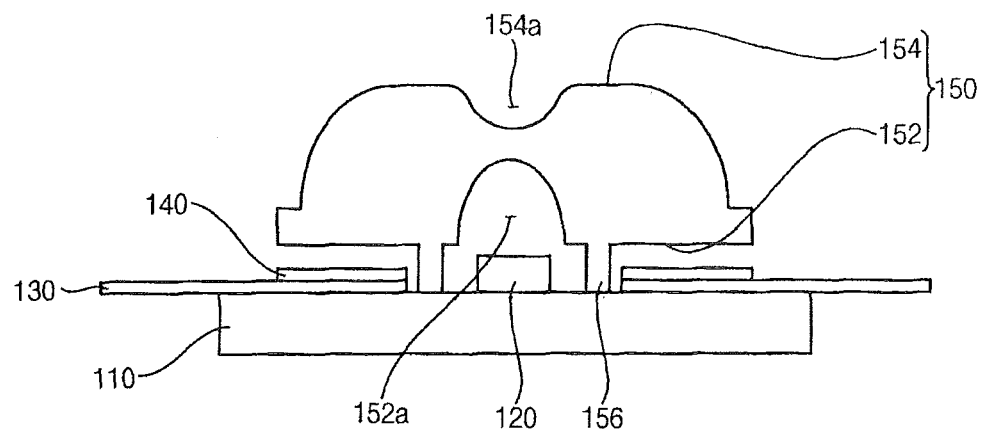
FIG. 4 is a cross-sectional view illustrating another exemplary embodiment of a light source assembly according to the invention.

FIG. 4 is a cross-sectional view illustrating another exemplary embodiment of a light source assembly according to the invention.

Referring to FIG. 4, the light source assembly is substantially same as a light source assembly of FIGS. 1 to 3, except for a shape of a lens 150. Thus, any further detailed descriptions concerning the same elements will be briefly described or omitted.

The light source assembly includes a substrate 110, and a plurality of light source parts disposed on the substrate 110. The light source part includes a light source 120, a first reflecting element 130, a second reflecting element 140 and a lens 150.

The lens 150 includes a top surface 154, and a bottom surface 152 opposite to the top surface 154.

The top surface 154 may have an overall dome shape. A top recess 154a is defined at a center of the top surface 154 which corresponds to the light source 120.

The bottom surface 152 faces the substrate 110. A bottom recess 152a is defined at a center of the bottom surface 152 which corresponds to the light source 120. Light from the light source 120 is refracted at surfaces of the top recess 154a and the bottom recess 152a, so that distribution of the light passing the lens 150 may be uniform.

A fixing portion 156 protrudes from the bottom surface 152 and is configured to allow separation of the bottom surface 152 from the light source 120 and to fix the lens 150 on the substrate 110. The fixing portion 156 is protruded from the lens 150 toward the substrate 110.

The fixing portion 156 is disposed corresponding to the marker 112 of the substrate 110. The fixing portion 156 corresponds to the marker 112, so that the fixing portion 156 may be attached and fixed on the marker 112 of the substrate 110. In one exemplary embodiment, for example, an adhesive layer (not shown) between the fixing portion 156 and the substrate 110 may be further disposed to attach the fixing portion 156 on the substrate 110.

Figure 5:
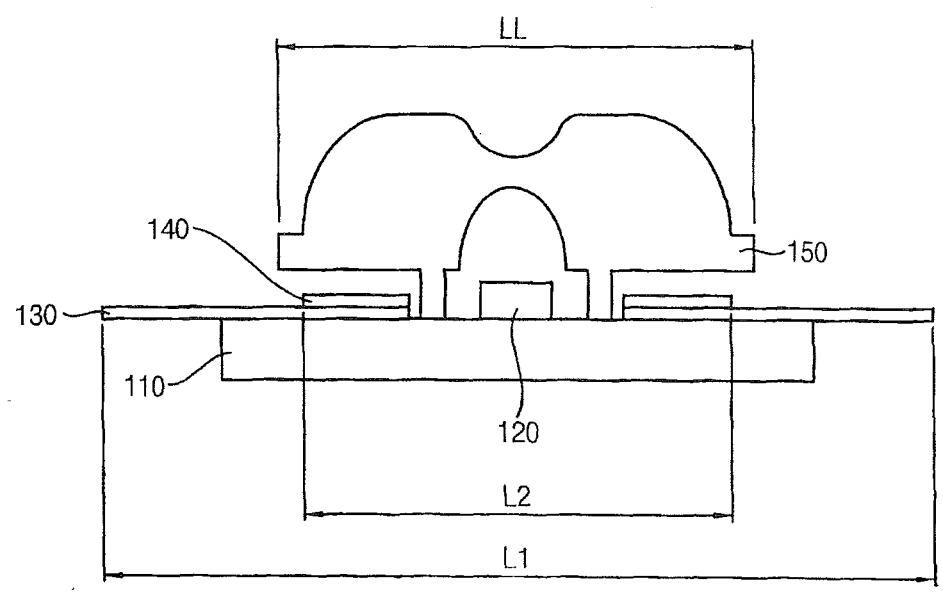
FIG. 5 is a cross-sectional view illustrating still another exemplary embodiment of a light source assembly according to the invention.

FIG. 5 is a cross-sectional view illustrating still another exemplary embodiment of a light source assembly according to the invention.

Referring to FIG. 5, the light source assembly is substantially same as a light source assembly of FIG. 4, except for sizes of first and second reflecting elements. Thus, any further detailed descriptions concerning the same elements will be briefly described or omitted.

The light source assembly includes a substrate 110, and a plurality of light source parts disposed on the substrate 110. The light source part includes a light source 120, a first reflecting element 130, a second reflecting element 140 and a lens 150.

The first reflecting element 130 is disposed on the substrate 110. A first opening is defined in the first reflecting element 130 (refer to 132 of FIG. 1) which exposes the light source 120 disposed on the substrate 110. The first opening exposes the light source 120 and a marker (refer to 112 of FIG. 1).

The first reflecting element 130 may have a circular sheet shape with the light source 120 as a center.

The first reflecting element 130 may include a material which cause mirror reflection. In one exemplary embodiment, for example, the first reflecting element 130 may be a reflecting sheet including silver or aluminum. The first reflecting element 130 reflects light from the light source 120 toward the lens 150.

The second reflecting element 140 is disposed on the first reflecting element 130. Thus, the second reflecting element 140 overlaps the first reflecting element 130. A second opening is defined in the second reflecting element 140 (refer to 142 of FIG. 1) which exposes the light source 120 disposed on the substrate 110. The second opening 142 exposes the light source 120 and the marker 112.

The second reflecting element 140 may have a circular sheet shape with the light source 120 as a center.

The second reflecting element 140 may include a material which causes a diffuse reflection. In one exemplary embodiment, for example, the second reflecting element 140 may be a reflecting sheet including PET. In addition, the second reflecting element 140 may have a white color. The second reflecting element 140 reflects light from the light source 120 toward the lens 150.

The second reflecting element 140 causes a diffuse reflection, and the first reflecting element 130 causes a mirror reflection, so that light distribution of reflected light on the first and second reflecting elements 130 and 140 may be controlled by adjusting a size of the second reflecting element 140.

Referring to FIG. 5, for example, when the lens 150 has a hemispherical shape in the cross-section with a circular shape in the plan view, the first reflecting element 130 has a circular sheet shape in the plan view, and the second reflecting element 140 has a circular sheet shape in the plan view, an external diameter L1 of the first reflecting element 130 may be more than 100% and less than about 130% of an external diameter LL of the lens 150, and an external diameter L2 of the second reflecting element 140 may be more than about 70% and less than 100% of the external diameter LL of the lens 150

Figure 6:
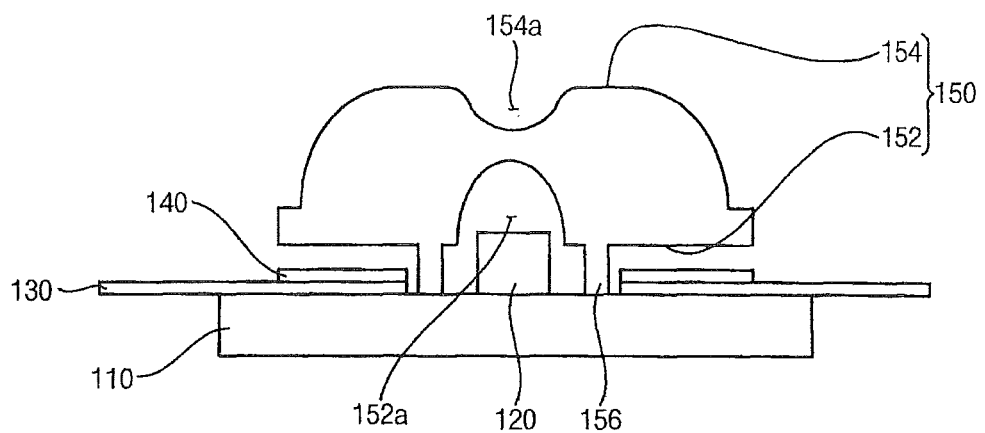
FIG. 6 is a cross-sectional view illustrating still another exemplary embodiment of a light source assembly according to the invention.

FIG. 6 is a cross-sectional view illustrating still another exemplary embodiment of a light source assembly according to the invention.

Referring to FIG. 6, the light source assembly is substantially same as a light source assembly of FIG. 4, except for a size and position of a light source. Thus, any further detailed descriptions concerning the same elements will be briefly described or omitted.

The light source assembly includes a substrate 110, and a plurality of light source parts disposed on the substrate 110. The light source part includes a light source 120, a first reflecting element 130, a second reflecting element 140 and a lens 150.

The lens 150 includes a top surface 154, and a bottom surface 152 opposite to the top surface 154. The top surface 154 may have an overall dome shape. A top recess 154a is defined at a center of the top surface 154 which corresponds to the light source 120.

The bottom surface 152 faces the substrate 110. A bottom recess 152a is defined at a center of the bottom surface 152 which corresponds to the light source 120. A fixing portion 156 protrudes from the bottom surface 152 and is configured to allow separation of the bottom surface 152 from the light source 120 and to fix the lens 150 on the substrate 110.

The light source 120 is disposed on the substrate 110. A portion of the light source 120 may be received in the bottom recess 152a of the lens 150. That is, a distance to the upper surface of the light source 120 from the substrate 110, is larger than a distance to the bottom surface 152 from the substrate 110. Accordingly, although a size of the light source 120 is increased as compared to other exemplary embodiments, the portion of the light source 120 may be received in the bottom recess 152a, so that an overall size and shape of the lens 150 may be maintained.

Figure 7:
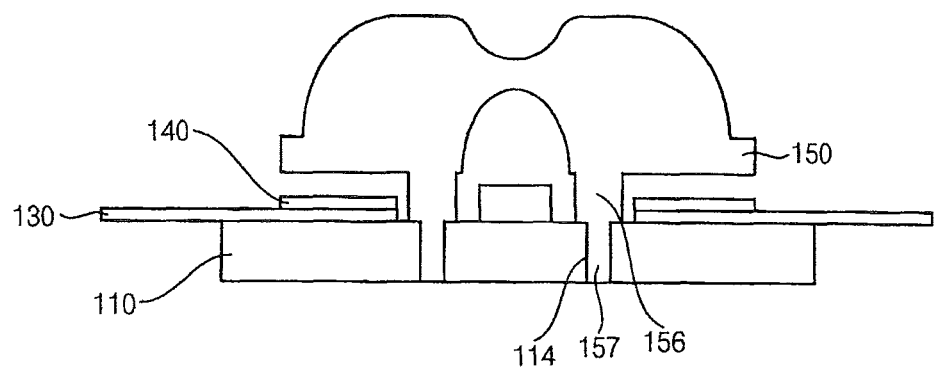
FIG. 7 is a cross-sectional view illustrating still another exemplary embodiment of a light source assembly according to the invention.

FIG. 7 is a cross-sectional view illustrating still another exemplary embodiment of a light source assembly according to the invention.

Referring to FIG. 7, the light source assembly is substantially same as a light source assembly of FIG. 4, except for a fixing hole 114 and a fixing protrusion 157. Thus, any further detailed descriptions concerning the same elements will be briefly described or omitted.

The light source assembly includes a substrate 110, and a plurality of light source parts disposed on the substrate 110. The light source part includes a light source 120, a first reflecting element 130, a second reflecting element 140 and a lens 150.

A fixing member includes a hole 114 defined in the substrate 110. The fixing hole 114 may have various shapes according to the lens 150. In one exemplary embodiment, for example, the fixing member may include three holes 114 disposed adjacent to the light source 120 and corresponding to vertexes of a triangle which has a center as the light source 120.

A fixing protrusion 157 is extended from a fixing portion 156 of the lens 150, such that the fixing portion 156 may be considered as including the fixing protrusion 157. The fixing protrusion 157 further protrudes from the fixing portion 156, and is received in the fixing hole 114 to fix the lens 150 on the substrate 110.

According to the illustrated exemplary embodiment, instead of a marker (refer to 112 of FIG. 1), the fixing hole 114 in the substrate 110 may guide a position of the lens 150. In addition, instead of using an adhesive on the marker to fix the fixing portion 156 of the lens 150, the lens 150 may be fixed on the substrate 110 solely by combining the fixing hole 114 and the fixing protrusion 157.

Figure 8:
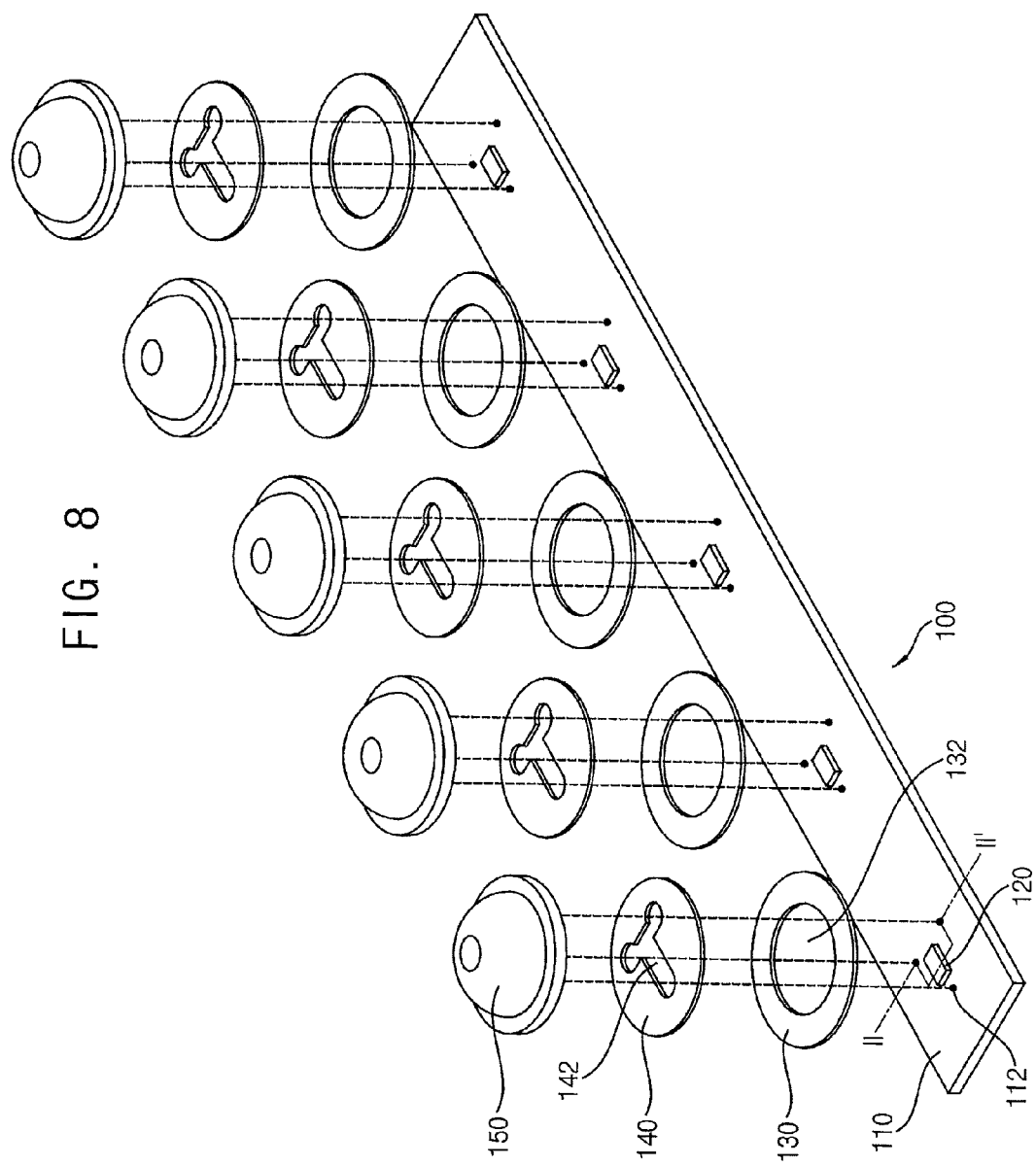
FIG. 8 is an exploded perspective view illustrating another exemplary embodiment of a light source assembly according to the invention.
Figure 9:
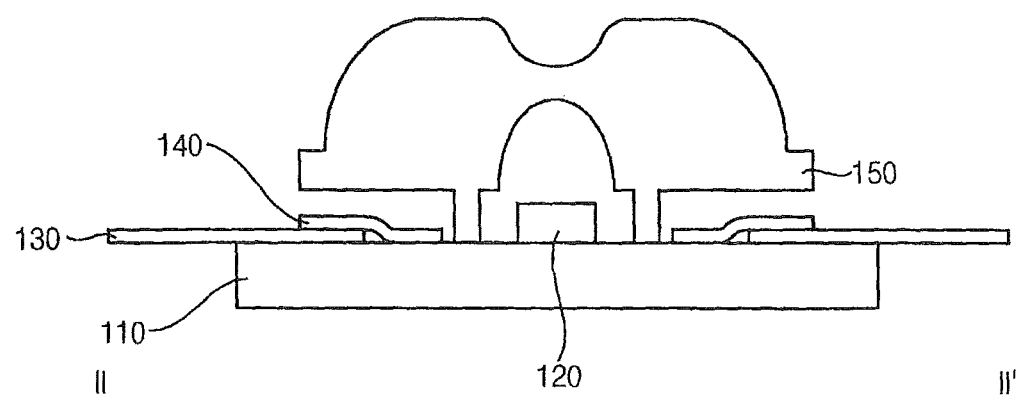
FIG. 9 is a cross-sectional view taken along line II-II' of FIG. 8.

FIG. 8 is an exploded perspective view illustrating another exemplary embodiment of a light source assembly according to the invention. FIG. 9 is a cross-sectional view taken along line II-II' of FIG. 8.

Referring to FIGS. 8 and 9, the light source assembly is substantially same as a light source assembly of FIG. 6, except for a first reflecting element 130 and a second reflecting element 140. Thus, any further detailed descriptions concerning the same elements will be briefly described or omitted.

The light source assembly includes a substrate 110, and a plurality of light source parts disposed on the substrate 110. The light source part includes a light source 120, a first reflecting element 130, a second reflecting element 140 and a lens 150.

The first reflecting element 130 is disposed on the substrate 110. A first opening 132 is defined in the first reflecting element 130 and exposes the light source 120 disposed on the substrate 110. The first opening 132 exposes the light source 120 and the marker 112. The first opening 132 may have a circular shape which exposes the light source 120 and the marker 112, such as for a manufacturing convenience.

The first reflecting element 130 may have a circular sheet shape with the light source 120 as a center. The first reflecting element 130 may have a cross-sectional thickness less than about 0.2 mm.

The first reflecting element 130 may include a material which causes mirror reflection. In one exemplary embodiment, for example, the first reflecting element 130 may be a reflecting sheet including silver or aluminum. The first reflecting element 130 reflects light from the light source 120 toward the lens 150.

The second reflecting element 140 is disposed on the first reflecting element 130. Thus, the second reflecting element 140 overlaps the first reflecting element 130.

A second opening 142 is defined in the second reflecting element 140 and exposes the light source 120 disposed on the substrate 110. The second opening 142 exposes the light source 120 and the marker 112. The second opening 142 may have a shape to minimize size thereof. In one exemplary embodiment, for example, when the marker 112 includes three discrete points adjacent to the light source 120, the second opening 142 may have a continuous shape to expose the light source 120 and the three points (refer to FIG. 3). An overall planar area of the second opening 142 is smaller than that of the first opening 132. Thus, the second opening 142 is disposed in the first opening 132, in the plan view. The first opening 132 is larger than the second opening 142, so that the manufacturing convenience for manufacturing the light source assembly may be improved. A size of the second opening 142 may be minimized, so that reflecting efficiency may be improved.

The second reflecting element 140 may have a circular sheet shape with the light source 120 as a center. The second reflecting element 140 may have a cross-sectional thickness less than about 0.2 mm. A portion of the second reflecting element 140 overlaps the first opening 132, and may contact the substrate 110, but the invention is not limited thereto.

The second reflecting element 140 may include a material which causes a diffuse reflection. In one exemplary embodiment, for example, the second reflecting element 140 may be a reflecting sheet including PET. In addition, the second reflecting element 140 may have a white color. The second reflecting element 140 reflects light from the light source 120 toward the lens 150.

Figure 10:
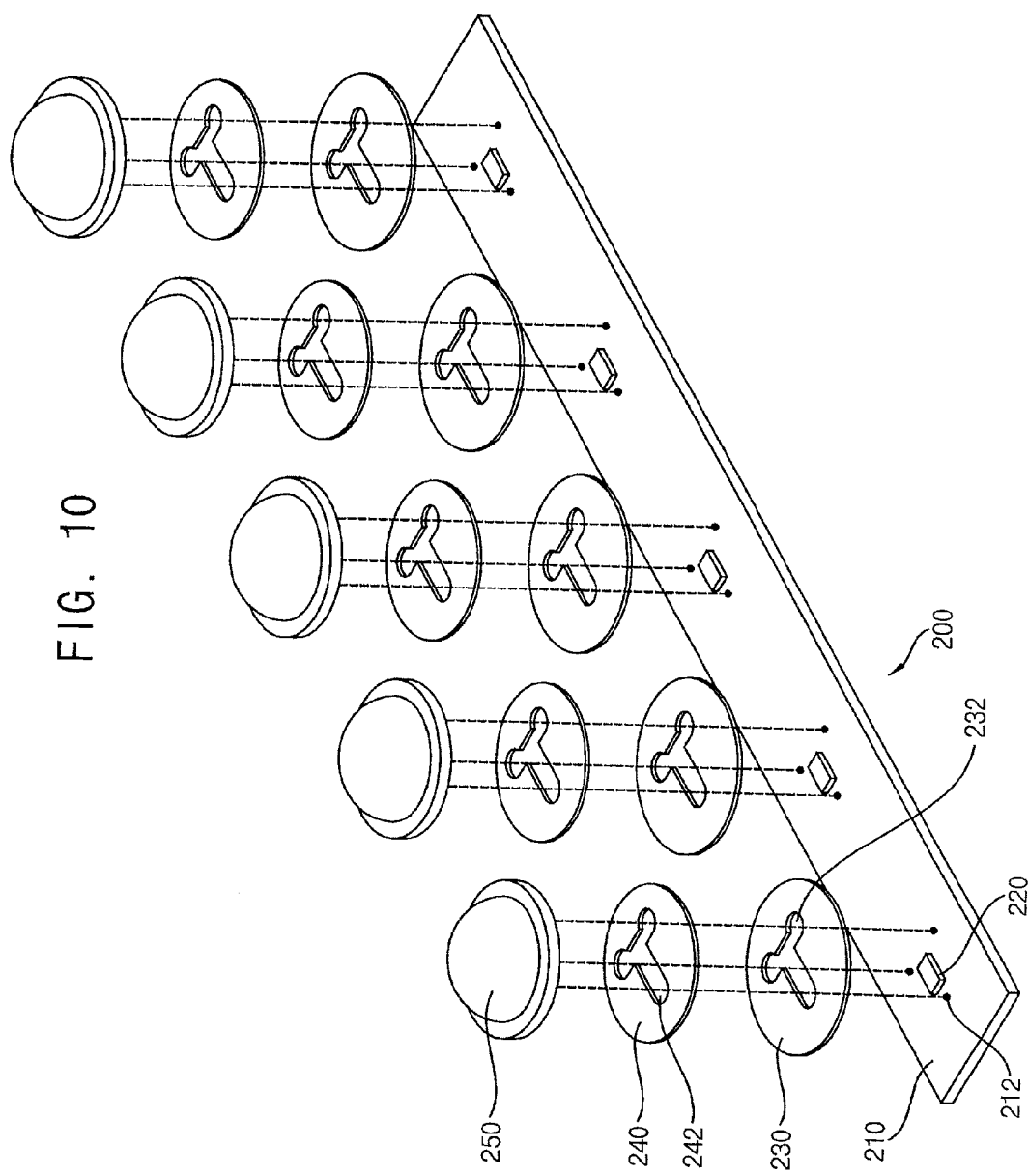
FIG. 10 is an exploded perspective view illustrating still another exemplary embodiment of a light source assembly according to the invention.

FIG. 10 is an exploded perspective view illustrating still another exemplary embodiment of a light source assembly according to the invention.

Referring to FIG. 10, a light source assembly 200 includes a substrate 210, and a plurality of light source parts disposed on the substrate 210. The light source part includes a light source 220, a first reflecting element 230, a second reflecting element 240 and a lens 250.

The substrate 210, a marker 212 on the substrate 210, the light source 220 and the lens 250 are substantially same as a substrate 110, a marker 112, a light source 120 and a lens 150 of FIG. 1. Thus, any further detailed descriptions concerning the same elements will be omitted.

The first reflecting element 230 is disposed on the substrate 210. A first opening 232 is defined in the first reflecting element 230 and exposes the light source 220 disposed on the substrate 210. The first opening 232 exposes the light source 220 and the marker 212. The first opening 232 may have a shape to minimize size thereof.

The first reflecting element 230 may have a circular sheet shape with the light source 220 as a center. The first reflecting element 230 may have a cross-sectional thickness less than about 0.2 mm.

The first reflecting element 230 may include a material which causes a diffuse reflection. In one exemplary embodiment, for example, the first reflecting element 230 may be a reflecting sheet including PET. In addition, the first reflecting element 230 may have a white color. The first reflecting element 230 reflects light from the light source 220 toward the lens 250.

The second reflecting element 240 is disposed on the first reflecting element 230. Thus, the second reflecting element 240 overlaps the first reflecting element 230 and is smaller than the first reflecting element 230. A second opening 242 is defined in the second reflecting element 240 and exposes the light source 220 disposed on the substrate 210. The second opening 242 exposes the light source 220 and the marker 212. The second opening 242 may have a shape to minimize size thereof.

The second reflecting element 240 may have a circular sheet shape with the light source 220 as a center. The second reflecting element 240 may have a cross-sectional thickness less than about 0.2 mm.

The second reflecting element 240 may include a material which cause mirror reflection. In one exemplary embodiment, for example, the second reflecting element 240 may be a reflecting sheet including silver or aluminum. The second reflecting element 240 reflects light from the light source 220 toward the lens 250. That is, in the illustrated exemplary embodiment, the first reflecting element 230 may cause a diffuse reflection while the second reflecting element 240 may cause a mirror reflection, opposite to that of the previous exemplary embodiments.

Figure 11:
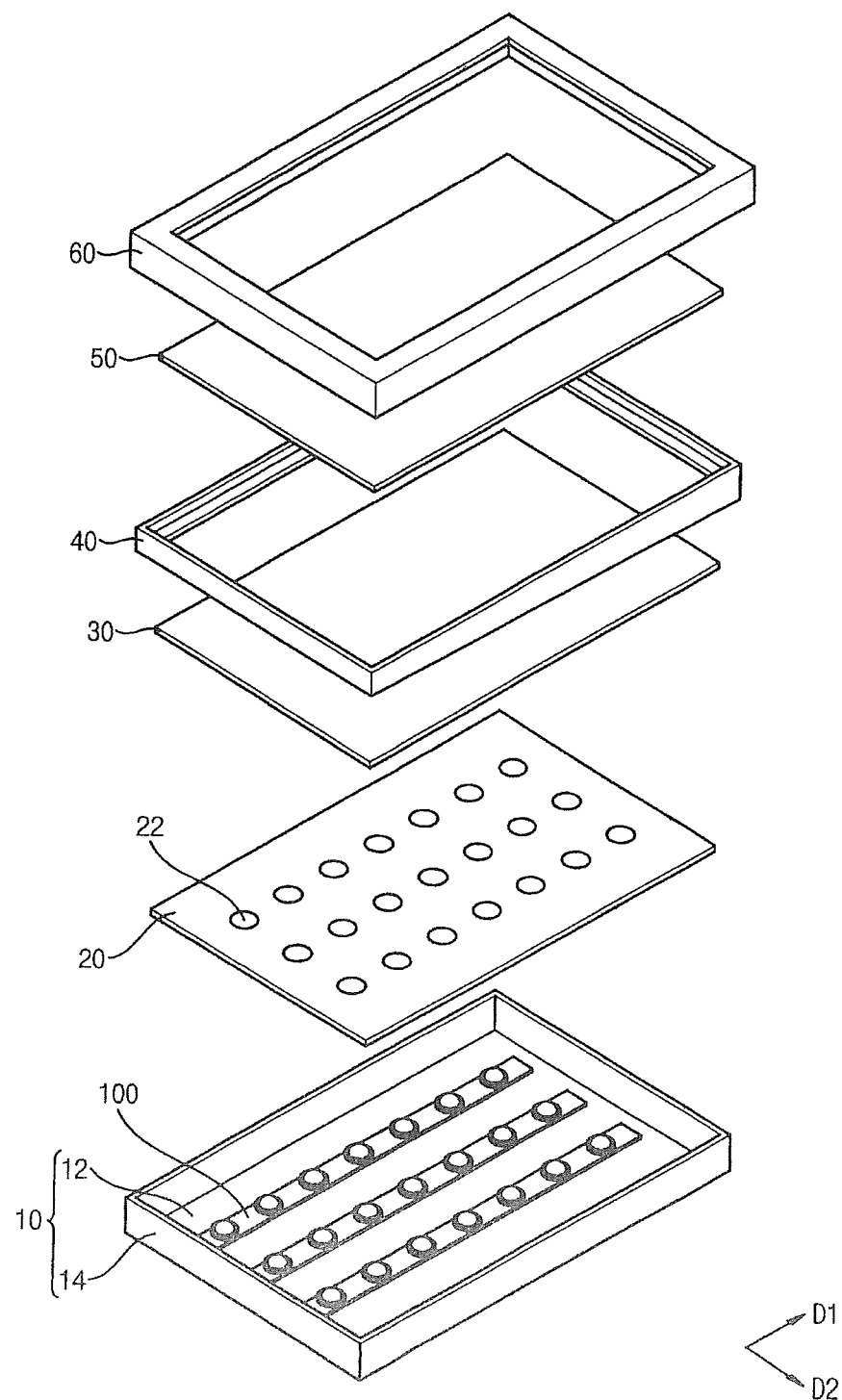
FIG. 11 is an exploded perspective view illustrating an exemplary embodiment of a display apparatus according to the invention.

FIG. 11 is an exploded perspective view illustrating an exemplary embodiment of a display apparatus according to the invention.

Referring to FIG. 11, a display apparatus includes a receiving container, a light source assembly 100, a reflecting sheet 20, an optical element 30, a mold frame 40 and a display panel 50.

The receiving container receives the light source assembly 100, the reflecting sheet 20, the optical element 30, the mold frame 40 and the display panel 50. The receiving container includes a bottom chassis 10 and a top chassis 60.

The bottom chassis 10 may include metal. In one exemplary embodiment, for example, the receiving container 10 may include aluminum or an alloy including aluminum. The bottom chassis 10 includes a bottom portion 12 and side walls 14. The side walls 14 extend from edges of the bottom portion 12 along a direction substantially perpendicular to a plane of the bottom portion 12.

The light source assembly 100 is received in the bottom chassis 10. The light source assembly 100 may be attached to the bottom portion 12 of the bottom chassis 10. In one exemplary embodiment, for example, an adhesive layer (not shown) may be disposed between the bottom portion 12 of the bottom chassis 10 and the light source assembly 100 to attach the light source assembly 100 to the bottom portion 12.

In the illustrated exemplary embodiment, the light source assembly 100 is substantially same as a light source assembly of FIG. 1, but the invention is not limited thereto. A plurality of light source assemblies 100 may be arranged in the bottom chassis 10. As shown in the illustrated exemplary embodiment, for example, each of the light source assembly 100 may extend in a first direction D1, and the light source assemblies 100 may be arranged in a second direction D2 substantially perpendicular to the first direction D1. Thus, light source parts (refer to FIG. 1) of the light source assemblies 100 are disposed at a regular interval in the first direction D1 and the second direction D2, so that light may be uniformly supplied to the display panel 50. While the first direction D1 is shown along a long side of the display apparatus, the invention is not limited thereto The reflecting sheet 20 is disposed in the receiving container and on the light source assemblies 100. A plurality of lens openings 22 is defined completely through a cross-sectional thickness of the reflecting sheet. The lens openings 22 correspond to the light source parts of the light source assemblies 100. A lens (refer to FIG. 1) of the light source assembly 100 passes the lens openings 22, so that the lens is extended over the reflecting sheet 20. The lens opening 22 is smaller than a first reflecting element (refer to 130 of FIG. 1) of the light source assembly 100. Thus, the reflecting sheet 20 may overlap a portion of the first reflecting element (refer to 130 of FIG. 1).

The reflecting sheet 20 may be attached on the bottom portion 12 of the bottom chassis 10. In an exemplary embodiment, for example, an adhesive layer (not shown) may be disposed between the bottom portion 12 of the bottom chassis 10 and the reflecting sheet 20 to attach the reflecting sheet 20 on the bottom portion 12.

The reflecting sheet 20 may include a material which causes a diffuse reflection. In one exemplary embodiment, for example, the reflecting sheet 20 may be a reflecting sheet including PET. In addition, the reflecting sheet 20 may have a white color. The reflecting sheet 20 reflects light from the light source (refer to 120 of FIG. 1) toward the lens 150.

The optical element 30 may improve optical property of the light from the light source assemblies 100. Thus, the optical element 30 may make brightness of the light from the light source assemblies 100 be substantially uniform. The optical element 30 may include plurality of optical sheets. In one exemplary embodiment, for example, optical element 30 may include a protecting sheet, a prism sheet and a diffusion sheet. The diffusion sheet is disposed on the reflecting sheet 20 and the light source assembly 100. The prism sheet is disposed on the diffusion sheet. The protecting sheet is disposed on the prism sheet. The prism sheet may include an upper prism sheet member and a lower prism sheet member. An extending axis of prisms of the upper prism sheet may be substantially perpendicular to an extending axis of prims of the lower prism sheet. Although the optical element 30 is described including the protecting sheet, the prism sheet and the diffusion sheet, many modifications of the optical sheets therein may be possible.

The mold frame 40 is disposed in the receiving container to fix the display panel 50 and the optical element 30 in the receiving container. The mold frame 40 may include an elastic material.

The display panel 50 displays an image using light from the light source assemblies 100 according to driving signal and data signal applied from outside the display panel 50. The display panel 50 includes an array substrate, an opposite substrate facing the array substrate, and a liquid crystal layer disposed between the array substrate and the opposite substrate.

The array substrate may include a plurality of gate lines, a plurality of data lines crossing the gate lines, and a plurality of switching element connected to the gate and data lines. The opposite substrate may include a black matrix blocking light and a color filter having a color. Although the opposite substrate includes the color filter in the described exemplary embodiment, the color filter may be disposed in the array substrate. The liquid crystal layer is disposed between the array substrate and the opposite substrate. The liquid crystal layer includes liquid crystal molecules having optically anisotropy. The liquid crystal molecules are driven by electric field, so that light may pass through or be blocked by the liquid crystal layer, to display an image on the display panel 50.

The display panel 50 may be electrically connected to a driving part (not shown) to drive the display panel 50. In one exemplary embodiment, for example, the driving part may be a flexible printed circuit board. The driving part may be electrically connected to the array substrate. The driving part may be disposed inside or outside of the bottom chassis 10.

FIGS. 12A to 12E are plan views illustrating an exemplary embodiment of a method of manufacturing a light source assembly according to the invention.

Figure 12A:
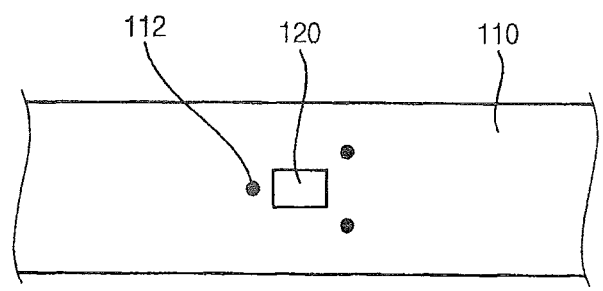
FIGS. 12A to 12E are plan views illustrating an exemplary embodiment of a method of manufacturing a light source assembly according to the invention.

Referring to FIG. 12A, a marker 112 and a light source 120 are formed (e.g., provided) on a substrate 110.

The substrate 110 may be an insulation substrate, a flexible printed circuit board, etc. The substrate 110 may have a bar shape which extends in a direction. A metal pattern (not shown) may be disposed on the substrate 110 and be configured to drive the light source 120. In one exemplary embodiment, for example, the substrate 110 may include a polyimide resin and, a copper wiring may be formed on the substrate 110 to drive the light source 120.

The marker 112 is formed on the substrate 110 and adjacent to the light source 120. The marker 112 may be formed by printing an ink on the substrate 110 (refer to FIG. 1). In addition, the marker 112 may be a fixing hole defined in the substrate 110 (refer to FIG. 7).

The marker 112 indicates a specific position on the substrate 110. The marker 112 may indicate a position for fixing the lens 150. The marker 112 may have various shapes according to the lens 150. In one exemplary embodiment, for example, the marker 112 may include three discrete points adjacent to the light source 120. The three points correspond to vertexes of a triangle which has a center as the light source 120.

The light source 120 may be a LED chip. The LED chip may be mounted on the substrate 110 by a SMT.

Figure 12B:
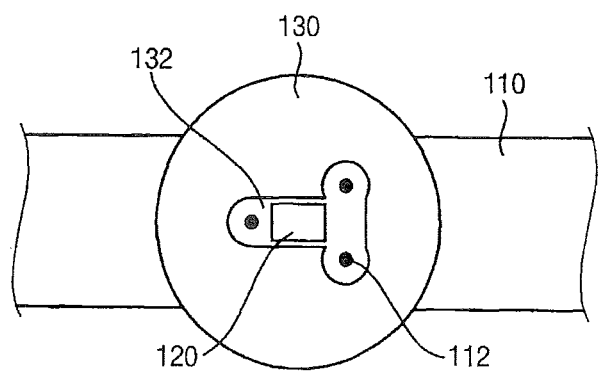

Referring to FIG. 12B, a first reflecting element 130 is formed on the substrate 110 including the marker 112 and the light source 120 thereon.

The first reflecting element 130 is disposed on the substrate 110. The first reflecting element 130 may be attached on the substrate 110. In one exemplary embodiment, for example, an adhesive layer (not shown) may be formed between the substrate 110 and the first reflecting element 130 to attach the first reflecting element 130 on the substrate 110.

A first opening 132 is defined in the first reflecting element 130 and exposes the light source 120 disposed on the substrate 110. The first opening 132 exposes the light source 120 and the marker 112. The first opening 132 may have a shape to minimize size thereof. In one exemplary embodiment, for example, when the marker 112 includes three points adjacent to the light source 120, the first opening 112 may have a continuous shape to expose the light source 120 and each of the three points (refer to FIG. 3).

As shown in the top plan view of FIG. 12B, the first reflecting element 130 may have a circular sheet shape with the light source 120 as a center. The first reflecting element 130 may have a cross-sectional thickness less than about 0.2 mm.

The first reflecting element 130 may include a material which cause mirror reflection, but is not limited thereto. In exemplary embodiment, for example, the first reflecting element 130 may be a reflecting sheet including silver or aluminum.

Figure 12C:
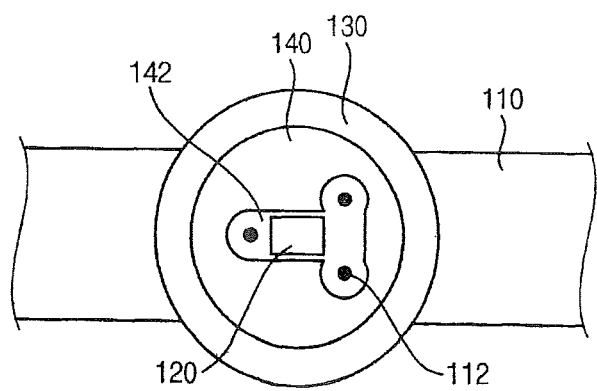

Referring to FIG. 12C, a second reflecting element 140 is formed on the first reflecting element 130. The second reflecting element 140 may be attached on the first reflecting element 130. In one exemplary embodiment, for example, an adhesive layer (not shown) may be formed between the first reflecting element 130 and the second reflecting element 140 to attach the second reflecting element 140 on the first reflecting element 130.

The second reflecting element 140 overlaps the first reflecting element 130. A second opening 142 is defined in the second reflecting element 140 and exposes the light source 120 disposed on the substrate 110 and the first opening 132 of the first reflecting member 132. The second opening 142 exposes the light source 120 and the marker 112. The second opening 142 may have a shape to minimize size thereof. In one exemplary embodiment, for example, when the marker 112 includes three points adjacent to the light source 120, the second opening 142 may have a continuous shape connecting configured to expose the light source 120 and each of the three points (refer to FIG. 3).

As shown in the top plan view of FIG. 12B, the second reflecting element 140 may have a circular sheet shape with the light source 120 as a center. The second reflecting element 140 may have a cross-sectional thickness less than about 0.2 mm.

The second reflecting element 140 may include a material which causes a diffuse reflection, but is not limited thereto. In one exemplary embodiment, for example, the second reflecting element 140 may be a reflecting sheet including PET. In addition, the second reflecting element 140 may have a white color.

Figure 12D:
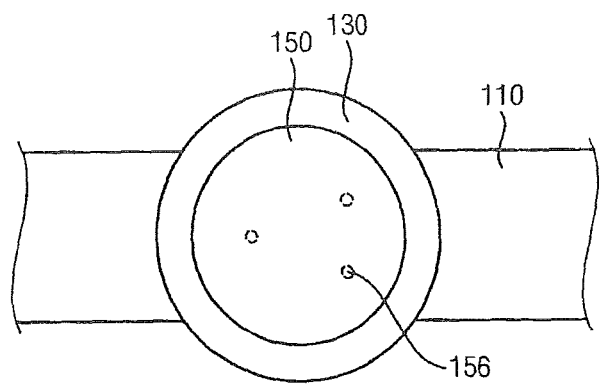

Referring to FIG. 12D, a lens 150 is formed on the substrate 110 including the light source 120, the first reflecting element 130 and the second reflecting element 140 thereon. The lens 150 may be disposed on the substrate 110. In one exemplary embodiment, for example, an adhesive layer (not shown) may be formed between the substrate 110 and the lens 150 to attach the lens 150 on the substrate 110.

A fixing portion 156 is formed on the bottom surface of the lens 150. The fixing portion 156 is aligned to correspond to the marker 112 of the substrate 110, and is attached on the substrate 110. In one exemplary embodiment, for example, an adhesive layer (not shown) may be formed between the fixing portion 156 and the substrate 110 to attach the fixing portion 156 on the substrate 110. The adhesive layer may include thermoset such as phenolic resin, urea resin, melanin resin, unsaturated polyester resin, epoxy resin, polyurethane resin, etc.

The fixing portion 156 of the lens 150 is disposed exactly on (e.g., aligned with) the marker 112 which is previously formed, such that the lens 150 may be disposed at a proper position with respect to the light source 120, so that the distribution of light from the light source 120 may be precisely controlled. The lens 150 coupled to the substrate 110 including the light source 120, the first reflecting element 130 and the second reflecting element 140 thereon exposes a portion of the first reflecting member 130, as illustrated in FIG. 12D.

Figure 12E:
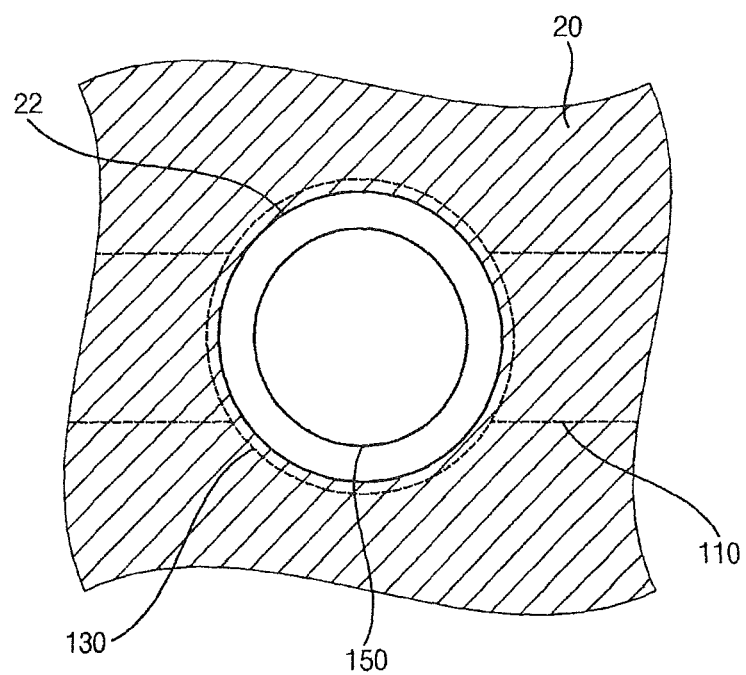

Referring to FIG. 12E, after the light source assembly including the substrate 110, the lens 150, the first and second reflecting elements 130 and 140 and the light source 120 is disposed in a receiving container of a display apparatus, a reflecting sheet 20 is disposed on the substrate 110. A plurality of lens openings 22 are formed through the reflecting sheet 20. A lens (refer to 150 of FIG. 1) passes the lens opening 22 and is disposed above the reflecting sheet 20. The lens opening 22 is smaller than a first reflecting element 130 of the light source assembly 100, and larger than the lens 150. Thus, the reflecting sheet 20 may overlap a portion of the first reflecting element 130 in the top plan view. The first and second reflecting elements 130 and 140 are disposed adjacent the lens 150 without a gap, so that reflecting efficiency may be improved. Accordingly, efficiency of the light source assembly may be improved.

FIG. 13 is a graph showing brightness of reflected light according to materials of reflecting element, with respect to a distance from a center of a light source.

Referring to FIGS. 13 and 1, a light source assembly 100 includes a substrate 110, and a plurality of light source parts disposed on the substrate 110. The light source part includes a light source 120, a first reflecting element 130, a second reflecting element 140 and a lens 150.

The first reflecting element 130 may include a material which cause mirror reflection. The second reflecting element 140 may include a material which causes a diffuse reflection.

The graph of FIG. 13 shows a brightness of reflected light according to a distance from a center of a light source 120, when a reflecting sheet under the light source 120 causes mirror reflection (line a in the graph) or diffuse reflection (line b in the graph). When the reflecting sheet cause mirror reflection (line a), a bright spot may be visible in the center of the light source 120. In addition, when the reflecting sheet cause diffuse reflection (line b), a dark spot may be visible in the center of the light source 120.

In one or more exemplary embodiment according to the invention, the second reflecting element 140 which cause diffuse reflection and is smaller than the first reflecting element 130, is disposed on the first reflecting element 130 which causes mirror reflection, adjacent to the light source 120. Since a portion of the mirror reflection first reflecting element 130 is exposed by the smaller diffuse reflection element 140, the bright spot in the center of the light source 120 may be darkened to essentially compensate for the exposed portion of the reflecting sheet causing mirror reflection (line a). Therefore, an exiting light distribution from the light source assembly 100 toward a display panel (refer to 50 of FIG. 11) may be uniform.

Referring to FIGS. 13 and 10, a light source assembly 200 includes a substrate 210, a plurality of light source parts disposed on the substrate 210. The light source part includes a light source 220, a first reflecting element 230, a second reflecting element 240 and a lens 250.

The first reflecting element 230 may include a material which causes a diffuse reflection. The second reflecting element 240 may include a material which cause mirror reflection.

The graph of FIG. 13 shows a brightness of reflected light according to a distance from a center of a light source 220, when a reflecting sheet under the light source 220 causes mirror reflection (line a in the graph) or diffuse reflection (line b in the graph). When the reflecting sheet cause mirror reflection (line a), a bright spot may be visible in the center of the light source 220. In addition, when the reflecting sheet cause diffuse reflection (line b), a dark spot may be visible in the center of the light source 220.

The second reflecting element 240 which cause mirror reflection and is smaller than the first reflecting element 230 is disposed on the first reflecting element 230 which causes diffuse reflection is disposed adjacent to the light source 220. Since a portion of the diffuse reflection first reflecting element 230 is exposed by the smaller mirror reflection element 240, the dark spot in the center of the light source 220 may be brightened to essentially compensate for the exposed portion of the reflecting sheet causing diffuse reflection (line b). Therefore, an exiting light distribution from the light source assembly 200 toward a display panel (refer to 50 of FIG. 11) may be uniform.

Figure 14:
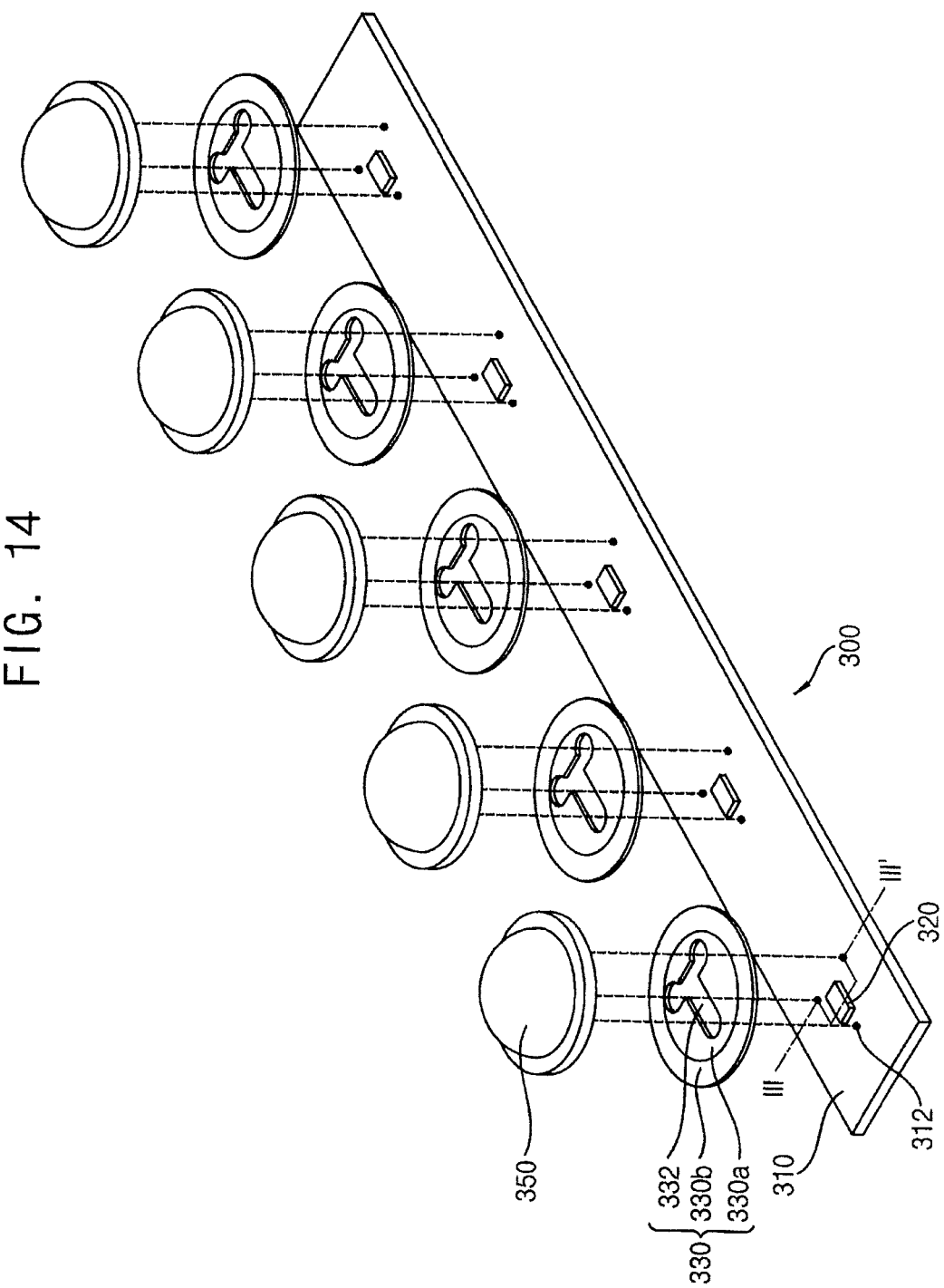
FIG. 14 is an exploded perspective view illustrating still another exemplary embodiment of a light source assembly according to the invention.
Figure 15:
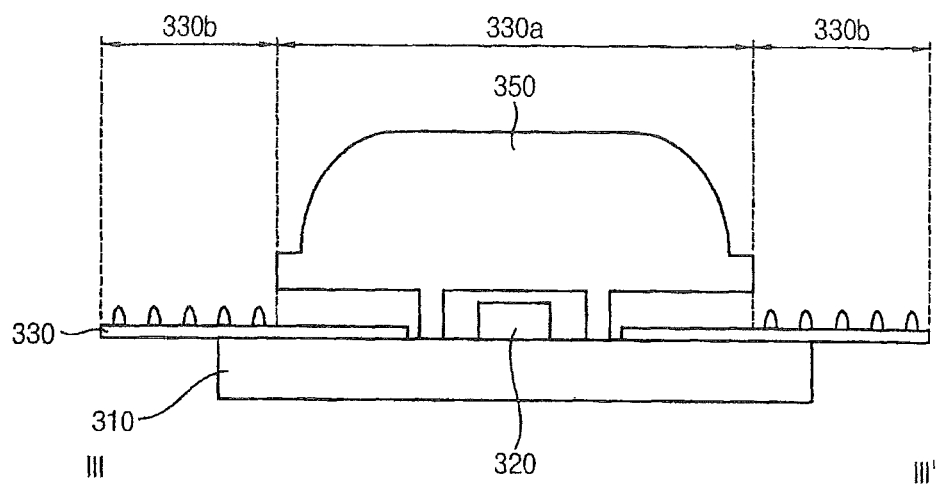
FIG. 15 is a cross-sectional view taken along line III-III' of FIG. 14.

FIG. 14 is an exploded perspective view illustrating still another exemplary embodiment of a light source assembly according to the invention. FIG. 15 is a cross-sectional view taken along line III-III' of FIG. 14.

Referring to FIG. 15, a light source assembly 300 includes a substrate 310, and a plurality of light source parts disposed on the substrate 310. The light source part includes a light source 320, a first reflecting element 330 and a lens 350.

The substrate 310, a marker of substrate 310, the light source 320 and the lens 350 are substantially same as a substrate 110, a marker 112, a light source 120 and a lens 150 of FIG. 1. Thus, any further detailed descriptions concerning the same elements will be briefly described or omitted.

The first reflecting element 330 is disposed on the substrate 310. A first opening 332 is defined in the first reflecting element 330 and exposes the light source 320 disposed on the substrate 310. The first opening 332 exposes the light source 320 and the marker 312. The first opening 332 may have a shape to minimize size thereof.

The first reflecting element 330 may have a circular sheet shape with the light source 220 as a center. The first reflecting element 330 may have a cross-sectional thickness less than about 0.2 mm.

The first reflecting element 330 may include a material which causes a diffuse reflection. In one exemplary embodiment, for example, the first reflecting element 330 may be a reflecting sheet including PET. In addition, the first reflecting element 330 may have a white color.

In a plan view, the first reflecting element 330 includes a first area 330a, and a second area 330b adjacent to the first area 330a. The first and second areas 330a and 330b, and the openings defined therein, may be concentric.

The first area 330a is adjacent to the light source 320 and overlaps the lens 350. The first area 330a is disposed between the light source 320 and the second area 330b in a plan view.

A plurality of beads is disposed on the first reflecting element 330 in the second area 330b. The beads may diffuse reflected light incident on the first reflecting element 330. In one exemplary embodiment, for example, the beads may include methylmethacrylate ("PMMA"), etc. In an exemplary embodiment of manufacturing a light source assembly, the beads may be formed by printing bead material coatings on first reflecting element 330. Each of the beads may have a size of about 1 micrometer (μm) to about 10 micrometers (μm) The beads may be considered discrete elements that protrude from an upper surface of the first reflecting element 330, and may be spaced apart from other along the upper surface of the first reflecting element 330.

Accordingly, the reflected light of the first reflecting element 330 in the second area 330b may be further diffused by the beads, so that diffuse reflection in the second area 330b is increased. Thus, an exiting light distribution may be uniform (refer to FIG. 12).

Figure 16:
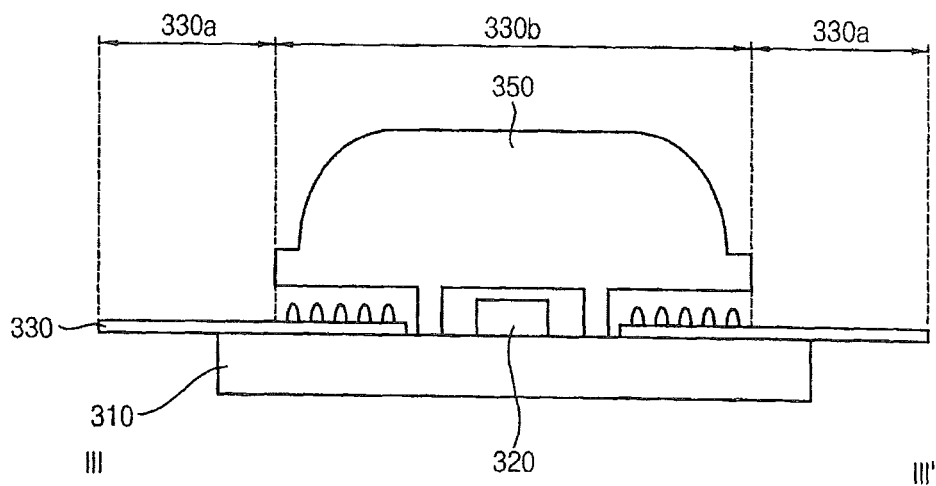
FIG. 16 is a cross-sectional view illustrating another exemplary embodiment of a light source assembly, taken along line III-III' of FIG. 14, according to the invention.

FIG. 16 is a cross-sectional view illustrating another exemplary embodiment of a light source assembly, taken along line III-III' of FIG. 14, according to the invention.

Referring to FIG. 16, a light source assembly 300 is substantially same as a light source assembly of FIGS. 14 and 15, except for the first reflecting element 330. Thus, any further detailed descriptions concerning the same elements will be briefly described or omitted.

The light source assembly 300 includes a substrate 310, and a plurality of light source parts disposed on the substrate 310. The light source part includes a light source 320, a first reflecting element 330 and a lens 350.

The first reflecting element 330 is disposed on the substrate 310. A first opening 332 is defined in the first reflecting element 330 and exposes the light source 320 disposed on the substrate 310.

The first reflecting element 330 may have a circular sheet shape with the light source 320 as a center. The first reflecting element 330 may have a cross-sectional thickness less than about 0.2 mm.

The first reflecting element 330 may include a material which causes mirror reflection. In one exemplary embodiment, for example, the first reflecting element 330 may be a reflecting sheet including silver or aluminum.

The first reflecting element 330 includes a first area 330a, and a second area 330b adjacent to the first area 330a.

The second area 330b is adjacent to the light source 320 and overlaps the lens 350. The second area 330b is disposed between the light source 320 and the first area 330a in a plan view.

A plurality of beads is disposed on the first reflecting element 330 in the second area 330b. The beads may diffuse reflected light on the first reflecting element 330. In one exemplary embodiment, for example, the beads may include PMMA, etc. In an exemplary embodiment of manufacturing a light source assembly, the beads may be formed by printing bead coatings on first reflecting element 330, and each of the beads has a size of about 1 μm to about 10 μm.

Accordingly, the reflected light on the first reflecting element 330 in the second area 330b may further diffused by the beads, so that mirror reflection in the second area 330b is decreased. Thus, an exiting light distribution may be uniform (refer to FIG. 12).

According to one or more exemplary embodiment according to the invention, a light source assembly includes first and second reflecting elements disposed adjacent to and/or under a light source, and having different sizes and different reflecting properties, so that distribution of exiting light from the light source assembly may be uniform.

In addition, one or more exemplary embodiment of a display apparatus according to the invention includes a reflecting sheet in which a lens opening defined larger than a lens of the light source assembly and smaller than the first reflecting element of the light source assembly, so that reflecting efficiency may be improved.

In addition, one or more exemplary embodiment of a light source assembly, a marker is disposed on a substrate of the light source assembly, and the lens of the light source assembly has a fixing portion corresponding to the marker, so that the lens may be disposed at a proper position on the substrate with respect to the light source.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A light source assembly comprising:
   a substrate extending in a first direction; and
   a plurality of light source parts arranged in the first direction, on the substrate,
   wherein among the plurality of light source parts arranged on the substrate, each light source part comprises:
      a light source which is on the substrate and generates light, provided in plural;
      a first reflecting element on the substrate, provided in plural to be disconnected from each other along the substrate, and a first opening which is defined in the first reflecting element and exposes the light source;
      a second reflecting element on the first reflecting element, provided in plural to be disconnected from each other along the substrate, and a second opening which is defined in the second reflecting element and exposes the light source, wherein the second reflecting element is smaller than the first reflecting element in a plan view; and
      a lens which is on the light source and the second reflecting element, and diffuses the light from the light source.

2. The light source assembly of claim 1, wherein
the first reflecting element comprises a material configured to cause mirror reflection of light, and the second reflecting element comprises a material configured to cause diffuse reflection of light, or
the first reflecting element comprises the material configured to cause diffuse reflection of light, and the second reflecting element comprises the material configured to cause mirror reflection of light.

3. The light source assembly of claim 2, wherein
the material configured to cause mirror reflection of light comprises silver or aluminum, and
the material configured to cause diffuse reflection of light comprises polyethylene phthalate and has a white color.

4. The light source assembly of claim 2, wherein
each of the first and second reflecting elements has a circular sheet shape,
the lens has a hemisphere shape,
an external diameter of the first reflecting element is more than about 100% and less than about 130% of an external diameter of the lens, in the plan view, and
an external diameter of the second reflecting element is more than about 70% and less than about 100% of the external diameter of the lens, in the plan view.

5. The light source assembly of claim 2, further comprising a marker which is disposed on the substrate and indicates a position of the lens relative to the light source on the substrate.

6. The light source assembly of claim 5, wherein the lens comprises:
   a top surface having a dome shape, a bottom surface opposite to the top surface, and a fixing part protruded from the bottom surface, and
   the fixing part is attached on the substrate and contacts the marker on the substrate.

7. The light source assembly of claim 6, wherein
the lens further comprises a fixing protrusion protruded from the fixing portion,
the marker is a fixing hole defined through the substrate, and
the fixing protrusion is in the fixing hole.

8. The light source assembly of claim 6, wherein
the marker on the substrate comprises three discrete points corresponding to vertexes Of a triangle which has a center at the light source, and
the fixing portion of the lens corresponds to the three discrete points.

9. The light source assembly of claim 8, wherein the first opening of the first reflecting element is larger than the second opening of the second reflecting element.

10. A light source assembly comprising:
a substrate extending in a first direction; and
a plurality of light source parts arranged in the first direction, on the substrate, provided in plural,
wherein among the plurality source parts arranged on the substrate, each light source comprises:
  a light source which is on the substrate and generates light;
  a first reflecting element on the substrate, provided in plural to be disconnected from each other along the substrate and comprising:
    a first area, and a second area adjacent to the first area, and
    a plurality of beads which is in the second area and diffuses the light in the second area;
  a first opening which is defined in the first reflecting element and exposes the light source; and
  a lens which is on the light source and the first reflecting element, and diffuses the light.

11. The light source assembly of claim 10, wherein
the first reflecting element comprises a material configured to cause diffuse reflection of light, and the first area is adjacent to the light source and between the light source and the second area in a plan view, or
the first reflecting element comprises a material configured to cause mirror reflection of light, and the second area is adjacent to the light source and between the light source and the first area in the plan view.

12. A display apparatus comprising:
a liquid crystal display panel which displays an image;
a light source assembly which generates and supplies light to the liquid crystal display panel, and is under the liquid crystal display panel;
a reflecting sheet between the liquid crystal display panel and the light source assembly, and a plurality of lens openings defined in the reflecting sheet; and
a receiving container which receives the liquid crystal display panel, the light source assembly and the reflecting sheet, and comprises a bottom portion, and side walls extending from the bottom portion substantially perpendicular to the bottom portion,
wherein the light source assembly comprises:
  a substrate which extends in a first direction and is on the bottom portion of the receiving container; and
  a plurality of light source parts arranged in the first direction, on the substarte,
  wherein among the plurality of light source parts arranged on the substrate, each light source part comprises:
    a light source which is on the substrate and generates the light, provided in plural;
    a first reflecting element on the substrate, provided in plural to be disconnected from each other along the substrate, and a first opening which is defined in the first reflecting element and exposes the light source;
    a second reflecting element which is on the first reflecting element, provided in plural to be disconnected from each other along the substrate, and a second opening which is defined in the second reflecting element and exposes the light source, wherein the second reflecting element is smaller than the first reflecting element in a plan view; and
    a lens which is on the light source and the second reflecting element, and diffuses the light from the light source, and
  wherein the lens openings of the reflecting sheet respectively correspond to the light source parts of the light source assembly.

13. The display apparatus of claim 12, wherein
the first reflecting element comprises a material configured to cause mirror reflection of light, and the second reflecting element comprises a material configured to cause diffuse reflection of light, or
the first reflecting element comprises the material configured to cause diffuse reflection of light, and the second reflecting element comprises the material configured to cause mirror reflection of light.

14. The display apparatus of claim 13, wherein a portion of the corresponding lens of the light source part of the light source assembly is above a corresponding lens opening of the reflecting sheet.

15. The display apparatus of claim 14, wherein in the plan view, the lens opening of the reflecting sheet is larger than the lens of the light source part of the light source assembly, and is smaller than the first reflecting element of the light source part of the light source assembly.

16. The display apparatus of claim 12, further comprising a plurality of light source assemblies on the bottom portion of the receiving container, wherein the light source assemblies are arranged in a second direction which is perpendicular to the first direction.

17. A method of manufacturing a display apparatus comprising:
forming a light source assembly;
disposing the light source assembly on a bottom portion of a receiving container; and
disposing a display panel in the receiving container,
wherein the forming the light source assembly comprises
  forming a plurality of light source parts on a substrate which extends in a first direction, the plurality of light source parts formed on the substrate by:
    mounting a light emitting diode chip on the substrate which extends in the first direction, by a surface mounting technology, the light emitting diode chip provided in plural;
    forming a first reflecting element in which a first opening is defined and exposes the light emitting diode chip, on the substrate having the light emitting diode chip thereon, the first reflecting element provided in plural to be disconnected from each other along the substrate;
    forming a second reflecting element in which a second opening is defined and exposes the light emitting diode chip, the second reflecting element being smaller than the first reflecting element, in a plan view; the second reflecting element provided in plural to be disconnected from each other along the substrate; and
    forming a lens on the substrate having the light emitting diode chip and the first and second reflecting elements thereon;
  wherein
    the first reflecting element comprises a material configured to cause mirror reflection of light, and the second reflecting element comprises a material configured to cause diffuse reflection of light, or
    the first reflecting element comprises the material configured to cause diffuse reflection of light, and the second reflecting element comprises the material configured to cause mirror reflection of light.

18. The method of claim 17, further comprising attaching a reflecting sheet on the light source assembly, after the disposing the light source assembly,
wherein
the forming the light source assembly further comprises forming a plurality of light source parts, and
a plurality of lens openings defined in the reflecting sheet corresponds to the plurality of the light source parts.

19. The method of claim 17, wherein the forming the light source assembly further comprises:
forming a marker adjacent to a position for the light emitting diode chip on the substrate, before the mounting the light emitting diode chip,
wherein the marker indicates the position for the light emitting diode chip on the substrate.

20. The method of claim 19,
wherein the lens comprises a top surface having a dome shape, a bottom surface opposite to the top surface, and a fixing portion protruded from the bottom surface, and
wherein the forming the lens comprises attaching the fixing portion to the marker on the substrate, to fix the lens on the substrate relative to the position for the light emitting diode chip.

* * * * *